(12) United States Patent  
Park

(10) Patent No.: US 11,070,012 B2  
(45) Date of Patent: Jul. 20, 2021

(54) ELECTRICAL OUTLET COVER PROVIDED WITH ELECTRIC WIRE ORGANIZER

(71) Applicant: SPREEO, Seoul (KR)

(72) Inventor: Kwan Kyu Park, Seoul (KR)

(73) Assignee: SPREEO

( * ) Notice: Subject to any disclaimer, the term of this patent is extended or adjusted under 35 U.S.C. 154(b) by 233 days.

(21) Appl. No.: 16/317,029

(22) PCT Filed: May 26, 2017

(86) PCT No.: PCT/KR2017/005542  
§ 371 (c)(1),  
(2) Date: Jan. 10, 2019

(87) PCT Pub. No.: WO2018/021671  
PCT Pub. Date: Feb. 1, 2018

(65) Prior Publication Data  
US 2019/0305493 A1    Oct. 3, 2019

(30) Foreign Application Priority Data  
Jul. 26, 2016   (KR) .................... 10-2016-0094563

(51) Int. Cl.  
*H01R 13/72* (2006.01)  
*H02G 3/14* (2006.01)  
*H01R 13/447* (2006.01)  
*H02G 3/30* (2006.01)  
*H01R 13/66* (2006.01)  
*H01R 13/60* (2006.01)

(52) U.S. Cl.  
CPC ........... *H01R 13/72* (2013.01); *H01R 13/447* (2013.01); *H01R 13/60* (2013.01); *H01R 13/66* (2013.01); *H02G 3/14* (2013.01); *H02G 3/30* (2013.01)

(58) Field of Classification Search  
CPC combination set(s) only.  
See application file for complete search history.

(56) References Cited

U.S. PATENT DOCUMENTS

| | | | | |
|---|---|---|---|---|
| 4,921,444 A * | 5/1990 | Cama | ..................... | H01R 13/60 439/528 |
| 5,547,390 A * | 8/1996 | Laherty | .............. | H01R 13/6395 439/373 |
| D445,766 S * | 7/2001 | Solomon | ..................... | D13/199 |
| 6,503,097 B2 * | 1/2003 | Archambault | ......... | H01R 13/60 439/4 |
| 7,172,456 B1 * | 2/2007 | Nagy | ..................... | H01R 13/72 174/135 |

(Continued)

FOREIGN PATENT DOCUMENTS

| KR | 20-0190883 Y1 | 8/2000 |
|---|---|---|
| KR | 20-0435152 Y1 | 1/2007 |

(Continued)

*Primary Examiner* — William H. Mayo, III  
*Assistant Examiner* — Krystal Robinson  
(74) *Attorney, Agent, or Firm* — Patent Office of Dr. Chung Park

(57) ABSTRACT

The present invention relates to an electric outlet cover attached to an electric outlet box installed on a wall or a power strip, the electric outlet cover being provided with an electric wire organizer which is capable of neatly winding and organizing various electric wires connected to the electric outlet.

10 Claims, 23 Drawing Sheets

(56) References Cited

U.S. PATENT DOCUMENTS

| | | | | |
|---|---|---|---|---|
| 7,230,181 B2* | 6/2007 | Simmons | ............... | B65H 75/36 |
| | | | | 174/138 G |
| 7,247,799 B2* | 7/2007 | Mori | ............... | H02G 3/105 |
| | | | | 174/135 |
| 7,255,588 B2* | 8/2007 | Wilder | ............... | H01R 13/6392 |
| | | | | 439/373 |
| D564,860 S * | 3/2008 | Levin | ............... | D8/350 |
| 7,528,323 B2* | 5/2009 | Wu | ............... | H01R 13/72 |
| | | | | 174/66 |
| 8,070,111 B1* | 12/2011 | Zeller | ............... | H02G 3/32 |
| | | | | 248/49 |
| 8,134,074 B2* | 3/2012 | Ong | ............... | H05K 7/1492 |
| | | | | 174/135 |
| 8,203,077 B2* | 6/2012 | Honeycutt | ............... | H02G 3/32 |
| | | | | 174/66 |
| D735,707 S * | 8/2015 | Dobben | ............... | D14/251 |
| 9,350,151 B2* | 5/2016 | Michaelis, IV | ............... | H02G 3/14 |
| 9,755,354 B1* | 9/2017 | Aumiller | ............... | H01R 13/72 |
| 9,941,642 B1* | 4/2018 | Waggoner | ............... | H01R 24/76 |
| 2004/0108126 A1* | 6/2004 | Kaloustian | ............... | H01R 13/72 |
| | | | | 174/67 |
| 2011/0220754 A1* | 9/2011 | Merten | ............... | H02G 11/02 |
| | | | | 242/400.1 |
| 2013/0196532 A1* | 8/2013 | Utz | ............... | H01R 13/72 |
| | | | | 439/471 |
| 2018/0159283 A1* | 6/2018 | Garcia | ............... | H01R 25/006 |

FOREIGN PATENT DOCUMENTS

| | | |
|---|---|---|
| KR | 10-086329 B1 | 10/2008 |
| KR | 100863291 B1 * | 10/2008 |
| KR | 10-1311219 B1 | 9/2013 |
| KR | 10-2014-0103670 A | 8/2014 |

* cited by examiner

ELECTRICAL OUTLET COVER PROVIDED WITH ELECTRIC WIRE ORGANIZER

CROSS-REFERENCE TO PRIOR APPLICATIONS

This application is a national Stage Patent Application of PCT International Patent Application No. PCT/KR2017/005542, filed on May 26, 2017 under 35 U.S.C. § 371, which claims priority of Korean Patent Application No. 10-2016-0094563, filed on Jul. 26, 2016, which are all hereby incorporated by reference in their entirety.

TECHNICAL FIELD

The present invention relates to an electrical outlet cover attached to an electrical outlet box installed on a wall or a power tap, and more particularly, to an electrical outlet cover provided with an electric wire organizer which is capable of neatly winding and organizing various electric wires connected to the electrical outlet.

BACKGROUND ART

As the industry develops, electrical devices of various kinds have been used.

Such an electrical device is powered when the electrical device plugs into an electrical outlet of the wall surface or an outlet of a power tap.

Most of the electrical devices have long electric wires to plug into the electrical outlet even though they are far away from the electrical outlet. However, if the electrical device is installed near to the electrical outlet, the long electric wire is scattered on the floor and makes a space messy.

DISCLOSURE

Technical Problem

Accordingly, the present invention has been made in view of the above-mentioned problems occurring in the prior art, and it is an object of the present invention to provide an electrical outlet cover provided with an electric wire organizer which is capable of winding and organizing a long electric wire, thereby neatly winding and organizing the long electric wire in the electrical outlet cover.

It is another object of the present invention to provide an electrical outlet cover provided with an electric wire organizer, which can be conveniently attached to an existing electrical outlet without replacing the existing electrical outlet mounted on a wall surface, and which can be also conveniently attached to a power tap widely used at an office or at home.

Technical Solution

To accomplish the above object, according to the present invention, there is provided an electrical outlet cover provided with an electric wire organizer including: a plate-shaped electrical outlet cover being joined to an electrical outlet box mounted on a wall surface or a power tap and having an outlet hole for exposing the wall outlet or an outlet of the power tap; and a wire winding part formed at an extended portion of the electrical outlet cover to allow a user to wind and organize an electric wire thereon. Therefore, the electrical outlet cover provided with an electric wire organizer according to the present invention can wind and neatly organize the electric wire plugged in a power tap or in a wall electrical outlet.

The wire winding part includes: a connection rod; support rods extending from both end portions of the connection rod in a vertical direction; and fasteners formed at ends of the support rods and combined with the electrical outlet cover.

In this instance, the wire winding part further includes: auxiliary support rods protruding from a middle portion of the connection rod in a vertical direction to the connection rod; and an auxiliary connection rod formed to connect ends of the auxiliary support rods with each other. Therefore, the electrical outlet cover according to the present invention can wind the electric wire in various ways.

Moreover, a storage part is formed in the electrical outlet cover in a recess form, and the wire winding part formed to be collapsible is folded and stored in the storage part.

In this instance, the electrical outlet cover according to the present invention further includes a door for opening and closing the storage part. The wire winding part is folded and stored in the storage part when not being used, and the door is closed so that the wire winding part is not exposed to the outside.

The collapsible wire winding part includes: a connection rod; support rods extending from both end portions of the connection rod in a vertical direction; and hinges for rotatably combining the support rods with the storage part.

In this instance, any one among the hinges is a rotational fastener including a body combined with the storage part, a rotation space formed in the body so that the support rod of the wire winding part is inserted into the rotation space, and a stopper protruding from the rotation space in a perpendicular direction to the support rod and being opened at one side, so that the wire winding part is folded or unfolded since the support rod moves and rotates toward the opened portion of the stopper inside the rotation space while the connection rod or the support rod of the wire winding part is deformed elastically, and the wire winding part is fixed in the folded state or in the unfolded state since the support rod 122 moves to one side of the stopper inside the rotation space while the connection rod or the support rod is restored elastically.

Furthermore, the collapsible wire winding part comprises: support rods spaced apart from each other at a predetermined interval, wherein one side end is joined to the storage part by a hinge; a connection rod connected with the other side ends of the support rods by hinges.

The collapsible wire winding part comprises a fixing unit for fixing the wire winding part in an unfolded state, so that the wire winding part is not folded arbitrarily.

The fixing unit includes: a spring; a fixing button elastically supported on the spring and protruding outwardly from the connection rod; a connector of which one end is connected with the fixing button and a middle portion is connected to a shaft inside the connection rod, wherein the connector rotates around the shaft; and a fastener protruding from the other end of the connector and inserted into a fixing groove of one among the support rods. The fastener fixes the wire winding part not to be folded in the state where the fastener is inserted into the fixing groove of the support rod, and then, when the fixing button is pressed, the wire winding part is folded while the fastener gets out of the fixing groove of the support rod.

Additionally, the collapsible wire winding part includes: a shaft of which both ends are joined to an inner wall of the storage part facing the wire winding part; support rods spaced apart from each other at a predetermined interval and protruding in a vertical direction to the shaft; and a connection rod for connecting ends of the support rods.

In addition, the collapsible wire winding part includes: support rods formed in '∩' shape, spaced apart from each other at a predetermined interval, and hinged to the storage part; and a connection rod hinged with end portions of the support rods.

In another aspect of the present invention, there is an electrical outlet cover provided with an electric wire organizer including: a plate-shaped electrical outlet cover being joined to an electrical outlet box mounted on a wall surface or a power tap and having an outlet hole for exposing the wall outlet or an outlet of the power tap; a '⊏'-shaped storage part formed at an edge portion of the electrical outlet cover; and a wire winding part inserted into the storage part. Moreover, the wire winding part includes: first drawing rods inserted into the storage part in a state where a support rod is joined to one end portion of each first drawing rod by a hinge; second drawing rods formed to be longer than the first drawing rods and inserted into the storage part in a state where a support rod is joined to one end portion of each second drawing rod by a hinge; and connection rods for connecting the ends of the support rods of the first drawing rods and the ends of the support rods of the second drawing rods, so that the wire winding part which is stored in the storage part of the electrical outlet cover is unfolded while being drawn out of the storage part.

In this instance, the wire winding part further comprises a fixing bar of which one end is rotatably hinged to any one among the support rods of the first drawing rods or the support rods of the second drawing rods and of which the other end is joined to the neighboring connection rod so that the wire winding part is fixed in an unfolded state.

Furthermore, a stopper is formed at an end portion of the storage part, and retaining jaws are formed at end portions of the first and second drawing rods, so that the first and second drawing rods are not separated from the storage part.

Additionally, the second drawing rods are formed in multiple stages to be extendable in length, so that the second drawing rods have the same length as the first drawing rods when being folded, and are longer than the first drawing rods when being unfolded.

In addition, a groove is formed at a portion of the storage part of the electrical outlet cover, so that the user can easily draw out the connection rods stored in the storage part with the hand.

Advantageous Effects

As described above, the electrical outlet cover provided with an electric wire organizer according to the present invention is capable of neatly winding and organizing various electric wires connected to the electrical outlet mounted on a wall surface or a power tap.

Moreover, the electrical outlet cover provided with an electric wire organizer according to the present invention can be conveniently attached to the existing electrical outlet mounted on the wall surface or the power tap without replacing the existing electrical outlet mounted on the wall surface or the power tap.

DESCRIPTION OF DRAWINGS

FIGS. 15 and 6 are views showing an electrical outlet cover provided with an electric wire organizer according to a fifth preferred embodiment of the present invention.

EXPLANATION OF REFERENCE NUMERALS IN DRAWINGS

Figure 1:
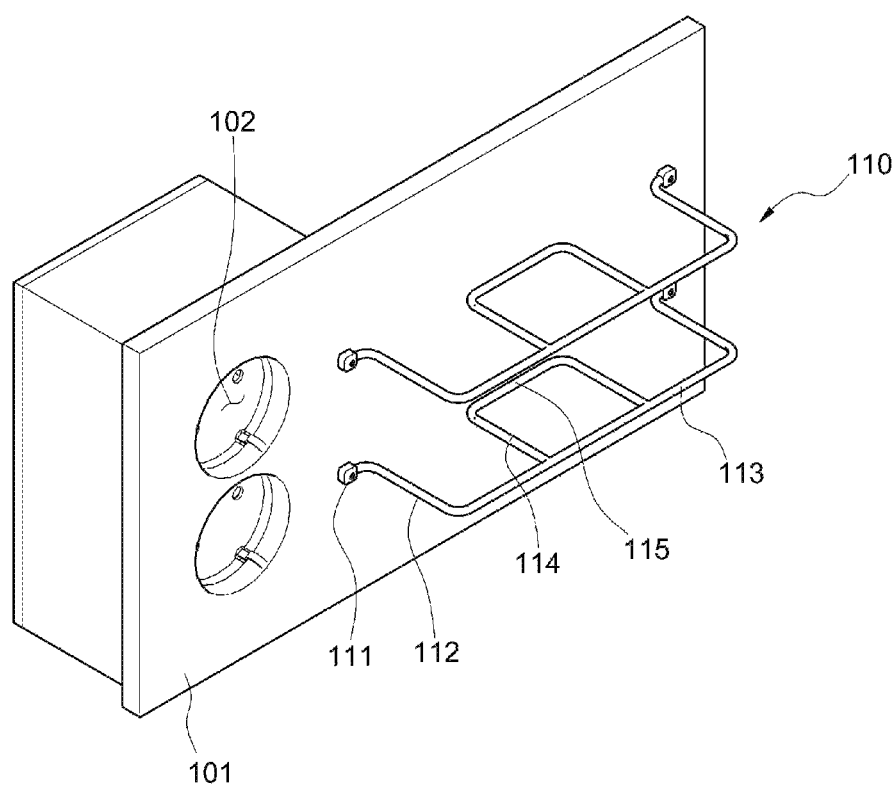
FIGS. 1 and 2 are views showing an electrical outlet cover provided with an electric wire organizer according to a first preferred embodiment of the present invention.

101: electrical outlet cover 102: outlet hole
103: door 104: storage part
105: groove 106: stopper
110: wire winding part 111: fastener
112: support rod 113: connection rod
114: auxiliary support rod 115: auxiliary connection rod
120: wire winding part 121: hinge
122: support rod 123: connection rod
124: auxiliary support rod 125: auxiliary connection rod
126: rotational fastener 127: body
128: rotation space 129: stopper
130: wire winding part 131: hinge
132: support rod 133: connection rod
134: fixing button 135: spring
136: connector 137: fastener
138: shaft 140: wire winding part
141: shaft 142: support rod
143: connection rod 150: wire winding part
151: hinge 152: support rod
153: connection rod 160: wire winding part
161: first drawing rod 162: hinge
163: second drawing rod 164: support rod
165: connection rod 166: fixing bar
167: retaining member 168: retaining jaw

BEST MODE

Hereinafter, a technical structure of the present invention will be described in detail with reference to the accompanying drawings. Hereinafter, preferred embodiments of the present invention will now be described in detail with reference to the attached drawings, in which like reference numbers denote corresponding parts throughout the drawings.

The terms "comprising" and "including" in the discussion directed to the present invention and the claims are used in an open-ended fashion and thus should be interrupted to mean "including", but not limited thereto, unless there is a particular description contrary thereto.

An electrical outlet cover according to the present invention includes an electrical outlet cover 101 attached to a wall outlet or a power tap, an outlet hole 102 formed in the electrical outlet cover 101, and a wire winding part 110 for winding and organizing an electric wire.

If the electrical outlet cover 101 is attached to the wall outlet or the power tap, the electrical outlet cover 101 or an electrical outlet of the power tap is exposed through the outlet hole 102 of the electrical outlet cover 101. So, a user can plug an electric device into the outlet hole 102.

First Embodiment

As shown in FIG. 1, the electrical outlet cover according to a first preferred embodiment of the present invention includes a flat-shaped electrical outlet cover 101 which will be attached to a wall outlet, and an outlet hole 102 formed in the electrical outlet cover 101.

Furthermore, the electrical outlet cover 101 extends in an axial direction, and a wire winding part 110 is mounted on the extended portion.

The wire winding part 110 includes support rods 112 extended and bent from both end portions of a horizontal connection rod 113, fasteners 111 formed at ends of the support rods 112 and combined with the electrical outlet cover 101 so that the wire winding part 110 is combined and fixed to the electrical outlet cover 101.

As shown in FIG. 1, a pair of the wire winding parts 110 are joined to the electrical outlet cover 101, and the electric wire is wound and organized on the connection rods 113 spaced apart from the electrical outlet cover 101 at a predetermined interval.

In this instance, as shown in FIG. 1, a pair of auxiliary support rods 114 protrude from a middle portion of the connection rod 113 in a vertical direction to be spaced apart from each other at a predetermined interval, and an auxiliary connection rod 115 is formed to connect ends of the auxiliary support rods 114 with each other, so that the electric wire can be organized just by one wire winding part 110.

Figure 2:
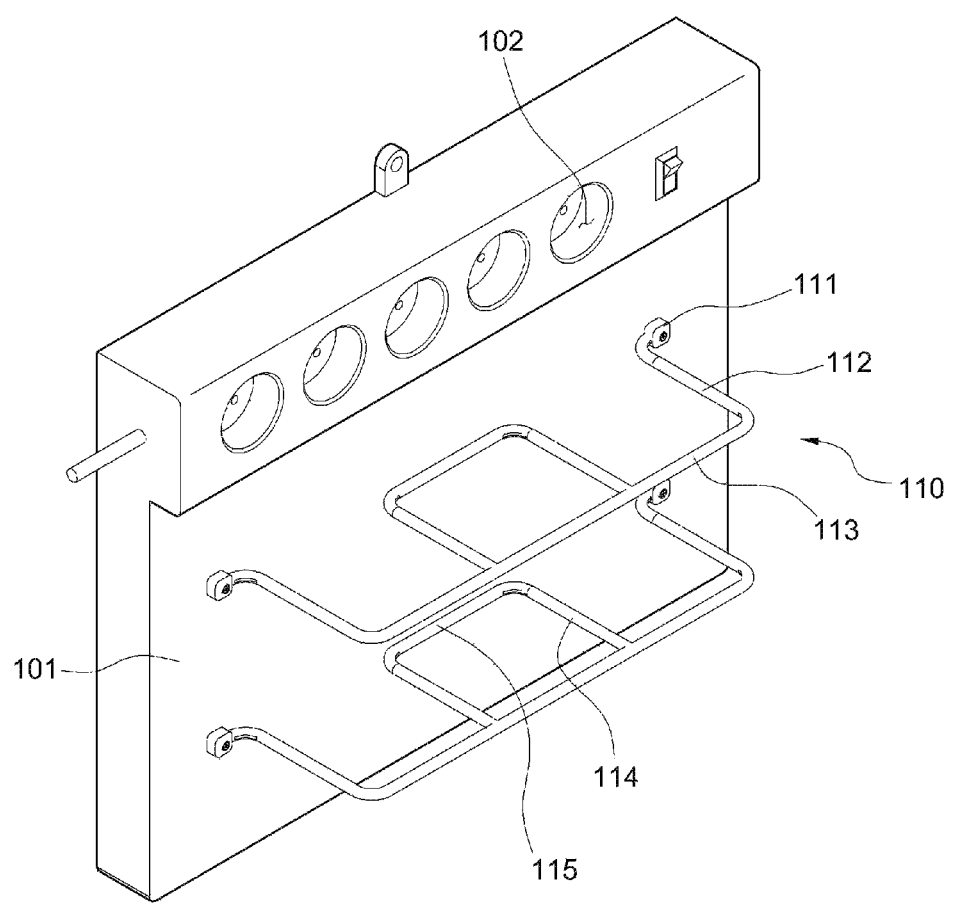

FIG. 1 illustrates that the electrical outlet cover according to the first preferred embodiment is joined to the wall outlet, but as shown in FIG. 2, the electrical outlet cover may have an outlet hole 102 formed to correspond to an electrical outlet of a power tap.

Mode for Invention

Second Embodiment

Figure 3:
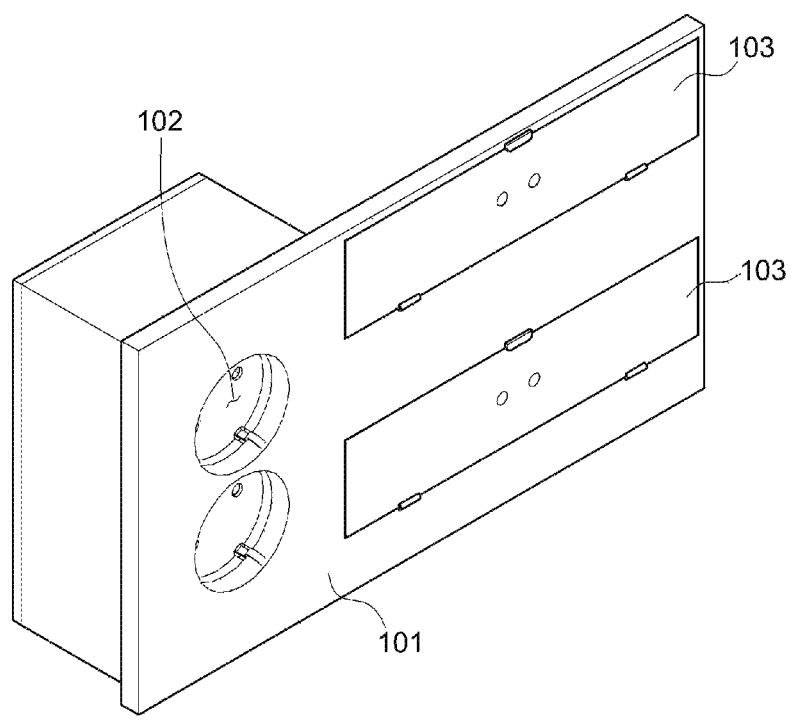
FIGS. 3 to 8 are views showing an electrical outlet cover provided with an electric wire organizer according to a second preferred embodiment of the present invention.
Figure 4:
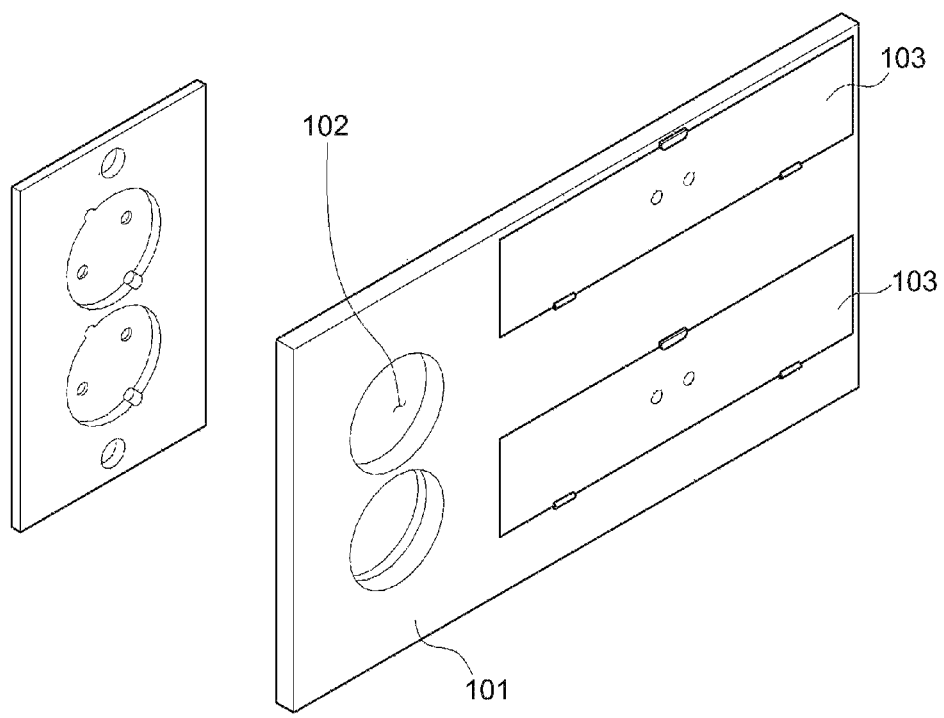

As shown in FIGS. 3 and 4, an electrical outlet cover according to a second preferred embodiment of the present invention includes a storage part 104 formed in an electrical outlet cover 101 in a recess form, a door 103 formed to open and close the storage part 104, and a wire winding part formed collapsibly and put in the storage part 104.

Figure 5:
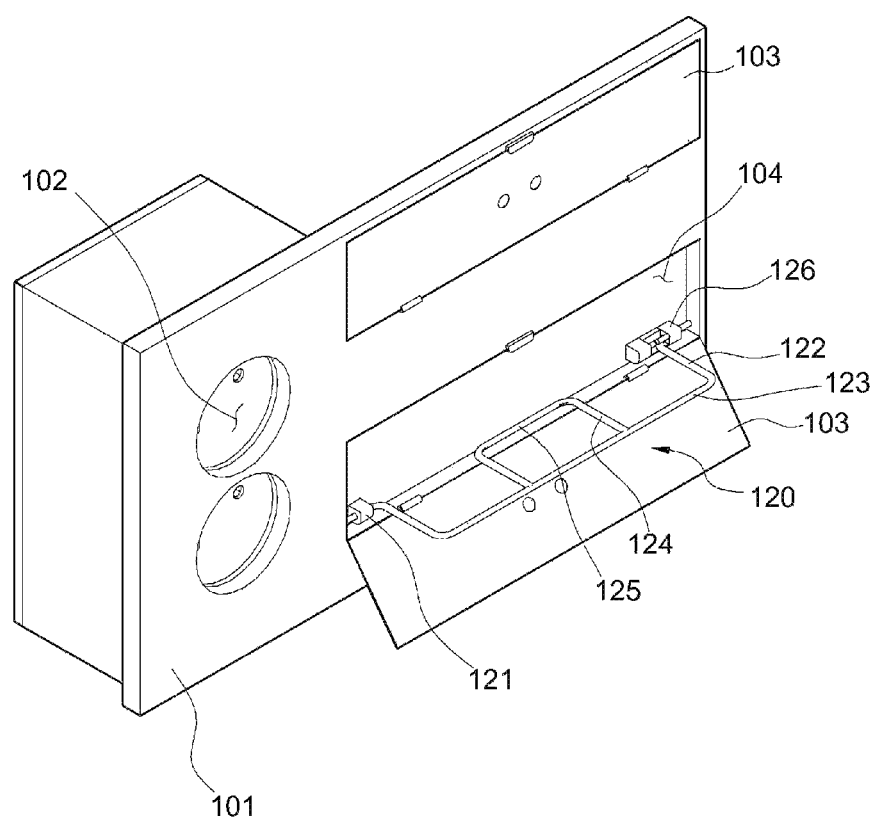

The collapsible wire winding part 120 mounted in the storage part 104, as shown in FIG. 5, includes a connection rod 123, support rods 122 extending from both end portions of the connection rod 123, and hinges 121 and rotational fasteners 126 for joining the wire winding part 120 into the storage part 104. Therefore, when the wire winding part 120 is not used, the wire winding part 120 is stored in the storage part 104 when a user folds the wire winding part 120 by the hinges 121 and the rotational fasteners 126 and closes the door 103. In order to plug into an electrical outlet and organize the electric wire, the user opens the door 103, unfolds the wire winding part 120 to protrude out of the storage part 104, and then, neatly winds and organizes the electric wire plugged in the electrical outlet on the wire winding part 120.

In this instance, as described above, the wire winding part 120 may have the auxiliary support rods 124 and the auxiliary connection rod 125 formed in the middle of the connection rod 123.

As described above, when the wire winding part 120 is folded and stored in the storage part 104 or when the wire winding part 120 is unfolded, the wire winding part 120 is fastened in the folded state or in the unfolded state by the rotational fasteners 126.

Figure 6:
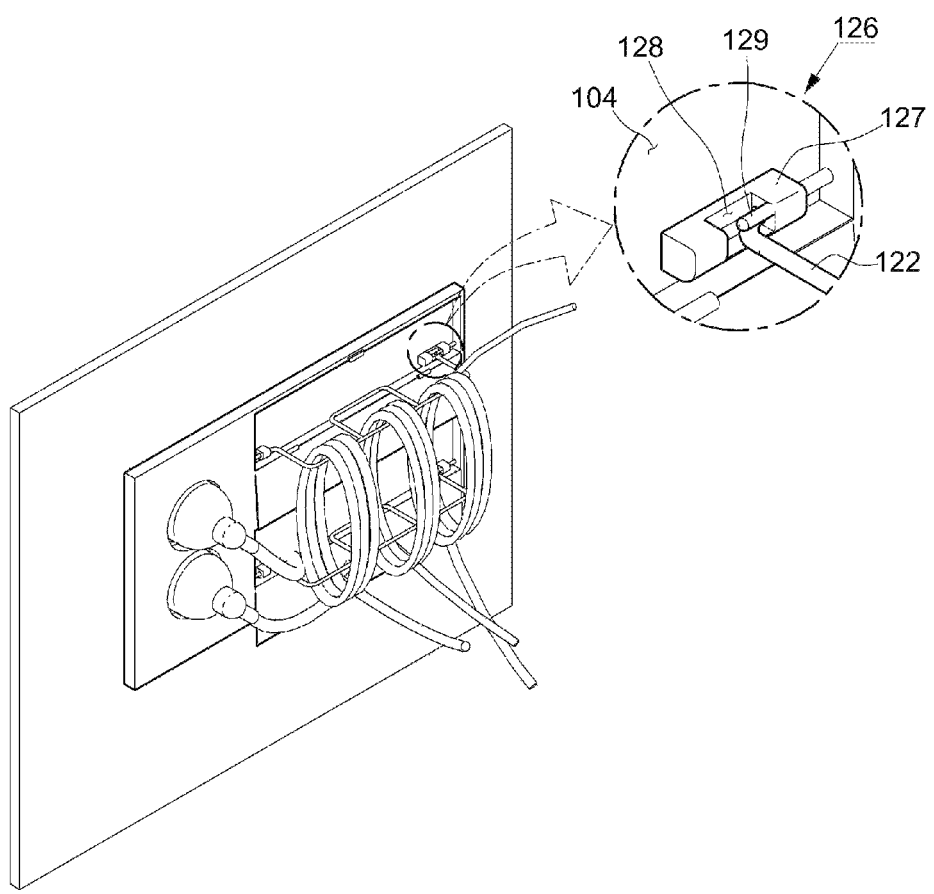

As shown in FIG. 6, the rotational fastener 126 has a rotation space 128 formed in the middle portion of a body 127, the support rod 122 of the wire winding part 120 is inserted into the rotation space 128, and a shaft of an end portion of the support rod 122 is inserted and hinged into a hole formed in the body 127 of the rotational fastener 126.

In this instance, a stopper 129 of which one side is opened in a vertical direction to the support rod 122 is formed in the rotation space 128.

Now, a process of fastening the wire winding part 120 by the rotational fasteners 126 will be described.

In a state where the wire winding part 120 is folded and stored in the storage part 104, the end portion of each support rod 122 is folded by being caught to the stopper 129 of the rotational fastener 126.

In order to unfold the folded wire winding part 120, when the user presses the support rod 122 joined to the rotational fastener 126 in the direction of the hinge 121, the connection rod 123 and the support rod 122 made of metal or synthetic resin are elastically deformed, and the end portion of the support rod 122 moves from the rotation space 128 of the rotational fastener 126 to an opened portion of the stopper 129.

Because the support rod 122 of the wire winding part 120 is located in an area getting out of the stopper 129 inside the rotation space 128, the wire winding part 120 is rotatable.

Additionally, when the wire winding part 120 is unfolded, shafts of the wire winding part 120 rotate around the rotational fasteners 126 and the hinges 121 and are unfolded as shown in FIG. 5.

As described above, in the state where the wire winding part 120 is rotated and unfolded, when power pressing the support rod 122 is removed, while the connection rod 123 and the support rod 122 are restored elastically, the end portion of the support rod 122 moves toward the stopper 129 in the rotation space 128, and the support rod 122 is located at one side of the stopper 129 to be fixed by the stopper 129.

As described above, in the state where the wire winding part 120 is unfolded, even though the electric wire is wound on the wire winding part 120, the rotational fasteners 126 fix the wire winding part 120 not to be folded.

In the second preferred embodiment, as shown in FIG. 6, in the state where an electric device plugs into the wall outlet, the electric wire is wound on the wire winding part 120 to be organized neatly. If the electric wire is not long, the wire winding part 120 is folded and stored in the storage part 104 of the electrical outlet cover 101, and then, the door 103 is covered, so that the wire winding part 120 is not exposed out.

Figure 7:
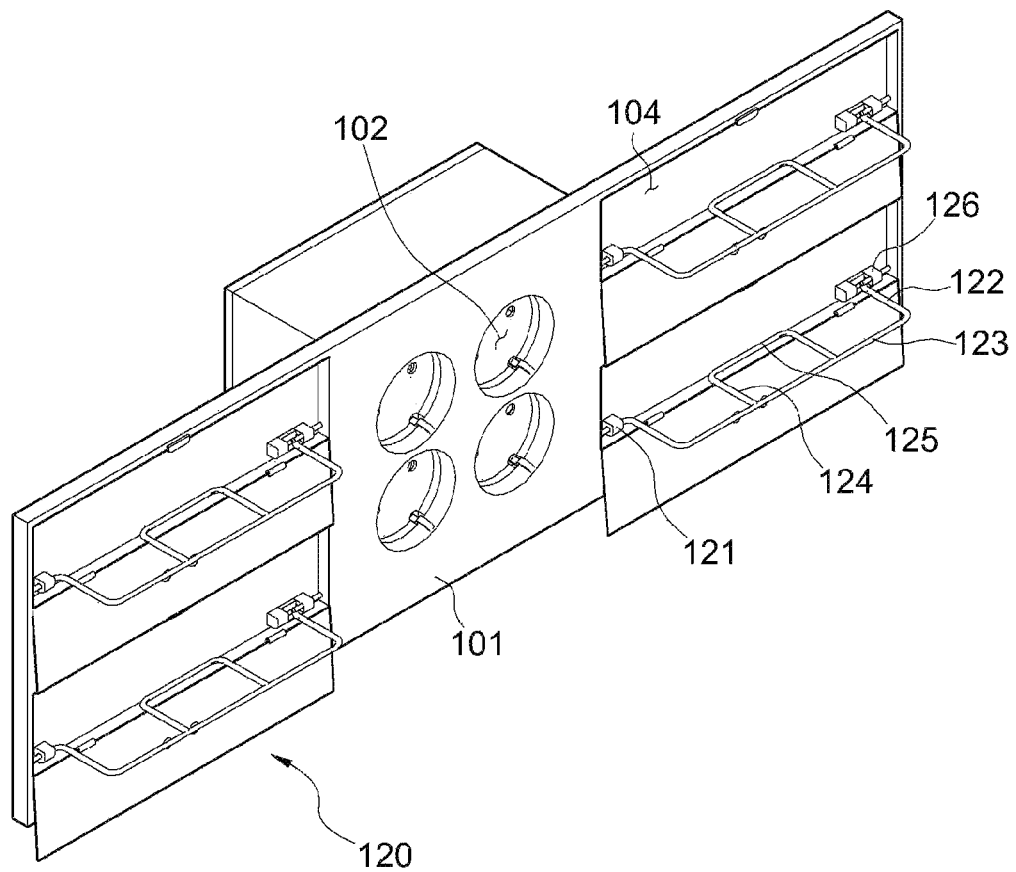

FIGS. 5 and 6 illustrate that the wire winding part 120 and the storage part 104 extend toward one side of the outlet hole 102, but as shown in FIG. 7, the electrical outlet cover 101 extends toward both sides of the outlet hole 102 and the wire winding part 120 and the storage part 104 may be formed at the both sides.

Figure 8:
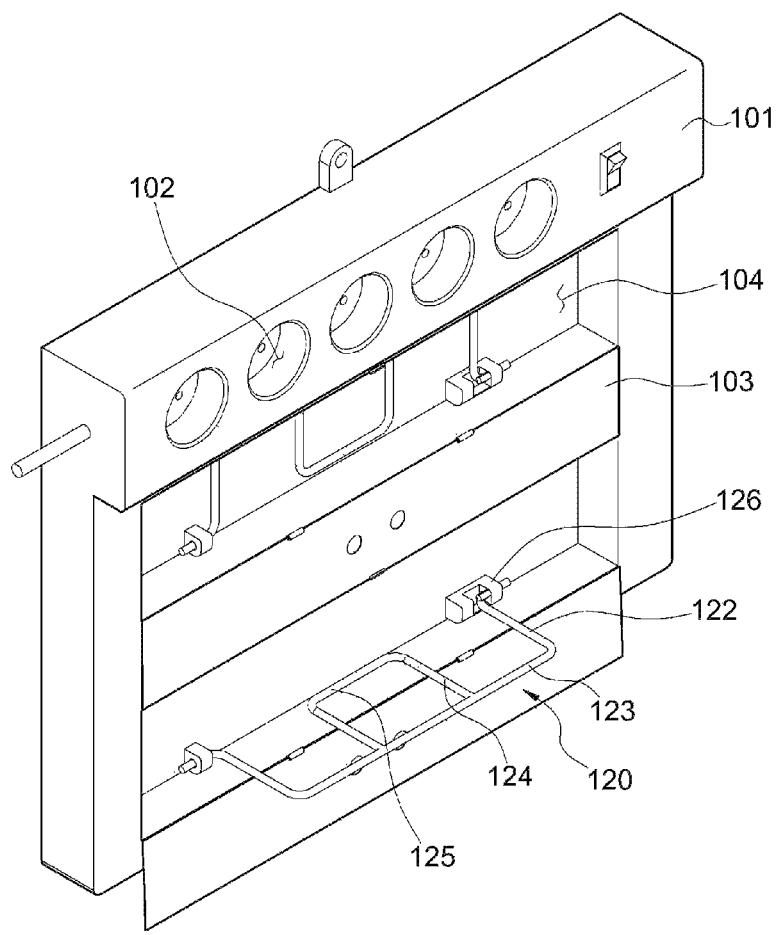

Moreover, the electrical outlet cover according to the present invention may be joined not only to the wall outlet but also to a power tap to organize the electric wire as shown in FIG. 8.

Third Embodiment

Figure 9:
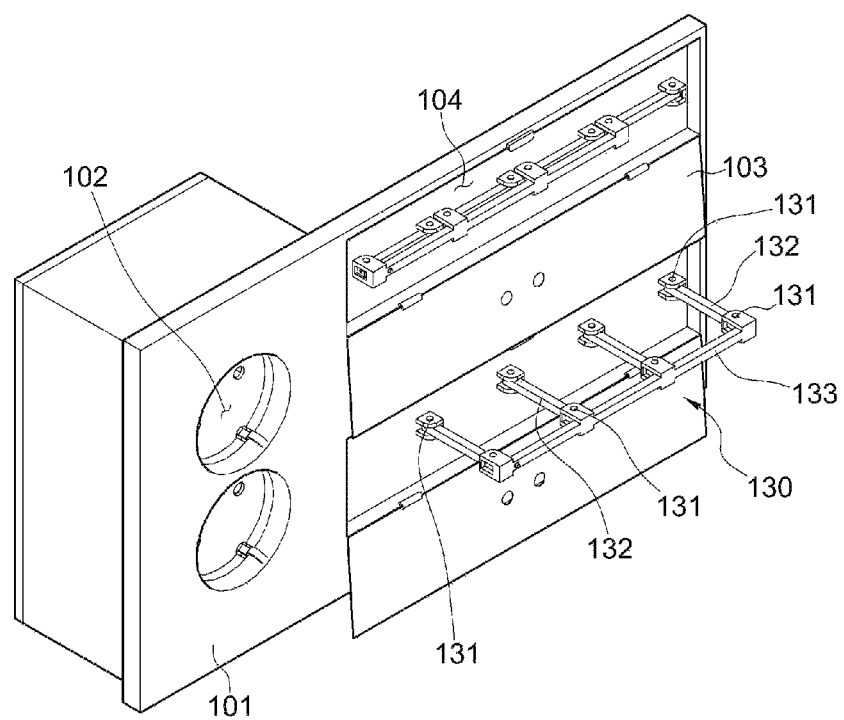
FIGS. 9 to 13 are views showing an electrical outlet cover provided with an electric wire organizer according to a third preferred embodiment of the present invention.

As shown in FIG. 9, an electrical outlet cover according to a third preferred embodiment of the present invention includes a storage part 104 formed in an electrical outlet cover 101 in a recess form, a door 103 formed to open and close the storage part 104, and a wire winding part formed collapsibly and put in the storage part 104.

Figure 10:
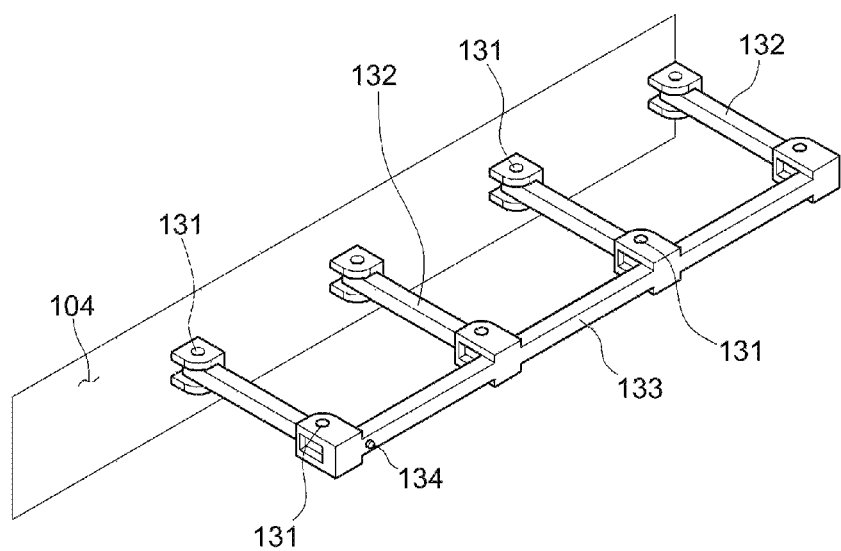

The collapsible wire winding part 130 mounted in the storage part 104, as shown in FIG. 10, includes bar-shaped support rods 132 joined to the storage part 104 at predetermined intervals by hinges 131, connection rods 133 joined to ends of the support rods 132 by hinges 131. When the support rods 132 are folded into the storage part 104, the connection rods 133 joined to the ends of the support rods 132 by the hinges 131 are also folded into the storage part 104.

In this instance, in order to prevent the wire winding part 130, which is in the unfolded state, from being folded arbitrarily, it is preferable to form a fixing unit.

Figure 11:
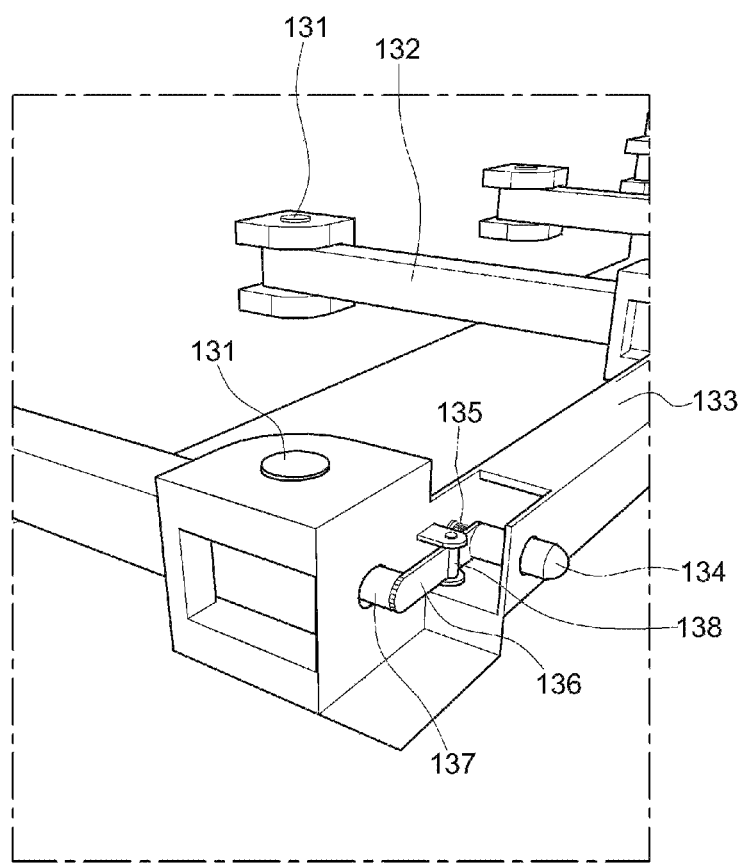

As shown in FIGS. 10 and 11, the fixing unit includes a fixing groove (not shown) formed at an end of the connection rod 133 of any one support rod 132 and a fixing button 134 protruding outwardly from the connection rod 133 getting in contact with the support rod 132 having the fixing groove. A lower end of the fixing button 134 is combined with an end of a connector 136, which is located in a vertical direction to the fixing button 134.

Furthermore, a central portion of the connector 136 is hinged with the connection rod 133 and a shaft 138. A fastener 137 is formed at the other end of the connector 136. The fastener 137 is at right angles to the connector 136, protrudes in the opposite direction to the fixing button 134, and is inserted into the fixing groove (not shown) of the support rod 132.

In this instance, as shown in FIG. 11, a spring 135 is mounted on the connector 136 to be supported on the connection rod 133 located at the opposite side of the fixing button 134 to elastically support the connector 136. The spring 135 may be supported on the connection rod 133 at the opposite side of the fastener 137 around the connector 136 to elastically support the connector 136.

When the wire winding part 130 illustrated in FIG. 10 is unfolded, as shown in FIG. 11, because the fastener 137 of the fixing unit is inserted into the fixing groove (not shown) formed at the end of the support rod 132 by elasticity of the spring 135, the wire winding part 130 is fixed without being folded.

Figure 12:
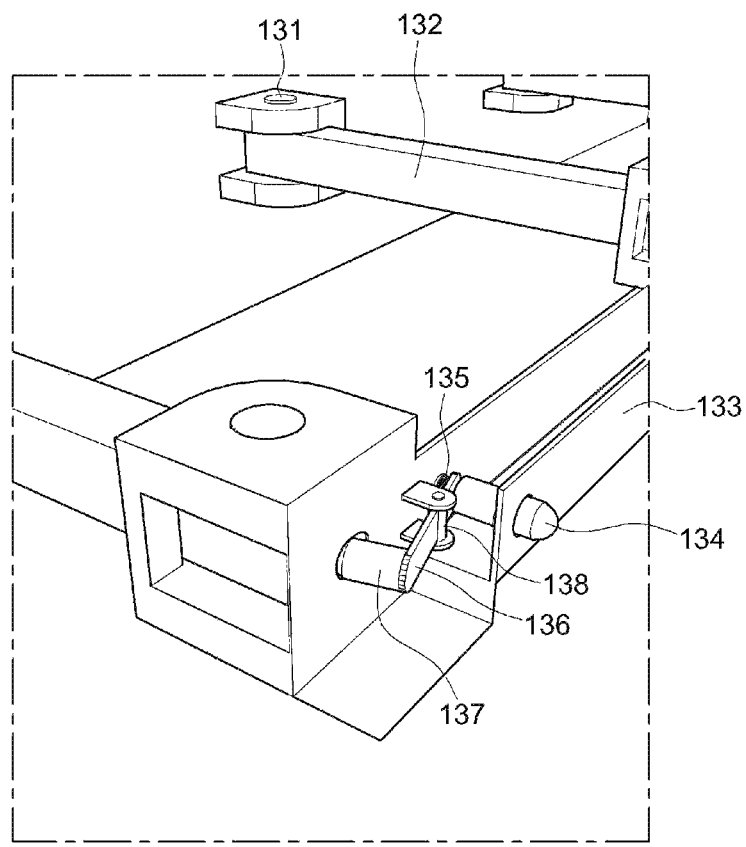

When the user presses the fixing button 134 protruding outwardly from the connection rod 133 in order to fold the wire winding part 130, as shown in FIG. 12, the connector 136 rotates around the shaft 138, the fastener 137 gets out of the fixing groove of the support rod 132 so that the wire winding part 130 is released from the fixed state. In the above state, the user can lay the wire winding part 130 down and fold the wire winding part 130.

Figure 13:
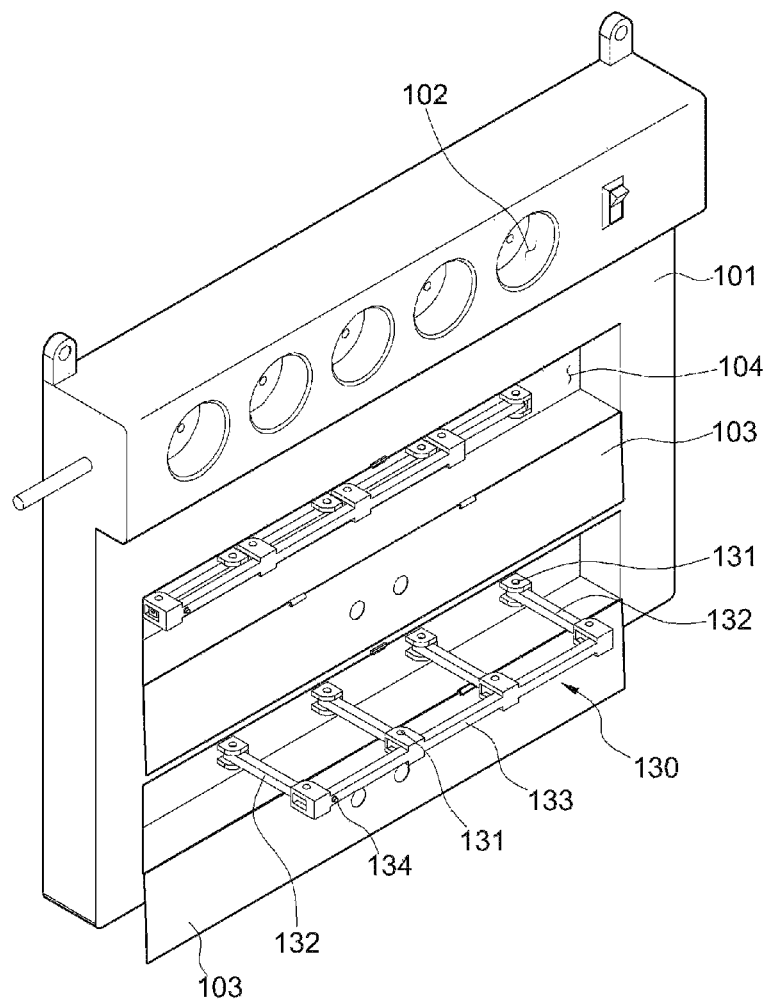

The electrical outlet cover according to the present invention may be joined not only to the wall outlet as shown in FIG. 9 but also to the power tap as shown in FIG. 13 to organize the electric wire plugged in the electrical outlet of the power tap.

Fourth Embodiment

Figure 14:
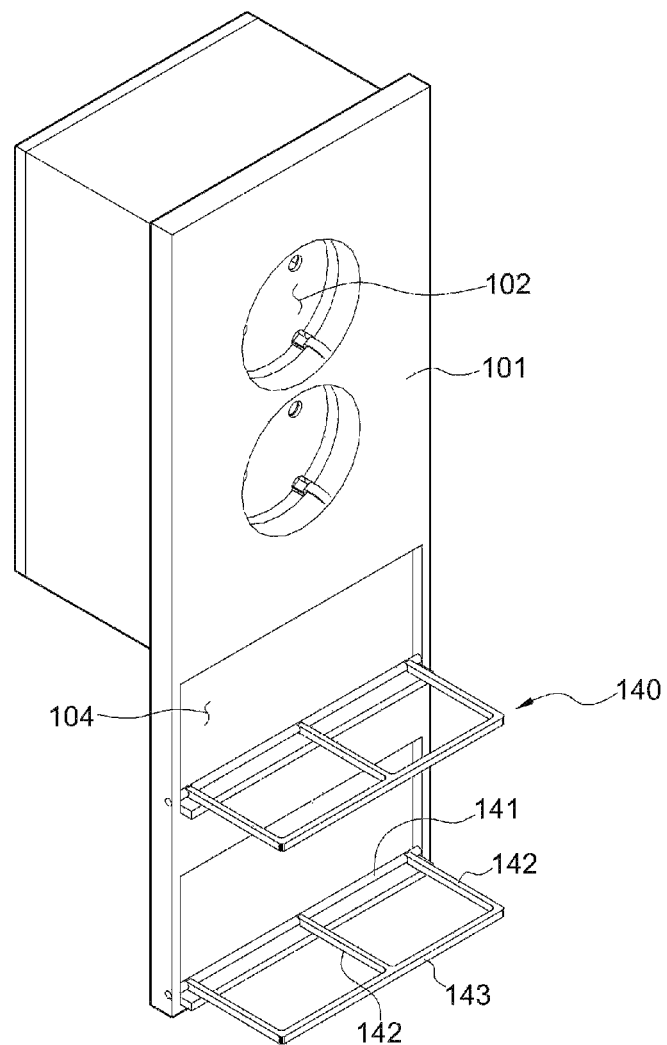
FIG. 14 is a view showing an electrical outlet cover provided with an electric wire organizer according to a fourth preferred embodiment of the present invention.

As shown in FIG. 14, an electrical outlet cover according to a fourth preferred embodiment of the present invention includes a storage part 104 formed in an electrical outlet cover 101 in a recess form, a door 103 formed to open and close the storage part 104, and a wire winding part 140 formed collapsibly and put in the storage part 104.

The collapsible wire winding part 120 mounted in the storage part 104 according to the fourth preferred embodiment shown in FIG. 14 does not have the door for opening and closing the storage part 104, but may have the door.

The collapsible wire winding part 120 mounted in the storage part 104, as shown in FIG. 14, includes: a shaft 141 crossing the storage part 104 wherein both ends of the shaft 14 are hinged with an inner wall of the storage part 104; a plurality of support rods 142 formed on the shaft 141 in a perpendicular direction to the shaft 141; and a connection rod 143 formed in the same direction as the shaft 141 to connect ends of the support rods 142.

Therefore, the electric wire plugged in the electrical outlet is neatly wound and organized in order of "support rod 142—support rod 142" or "connection rod 143—connection rod 143" of the wire winding part 140.

When the wire winding part 140 is not used, the user folds the wire winding part 140 and stores it in the storage part 104. As an occasion demands, a door (not shown) for opening and closing the storage part 104 is mounted to hide the wire winding part 140 by closing the storage part 104.

FIG. 14 illustrates the wire winding part 140 formed in such a way that the electrical outlet cover 101 extends downwardly from the electrical outlet, but may extend to one side, to both sides or to an upper portion.

Additionally, the electrical outlet cover according to the fourth preferred embodiment of the present invention may be joined not only to the wall outlet but also to a power tap to organize the electric wire.

Fifth Embodiment

Figure 15:
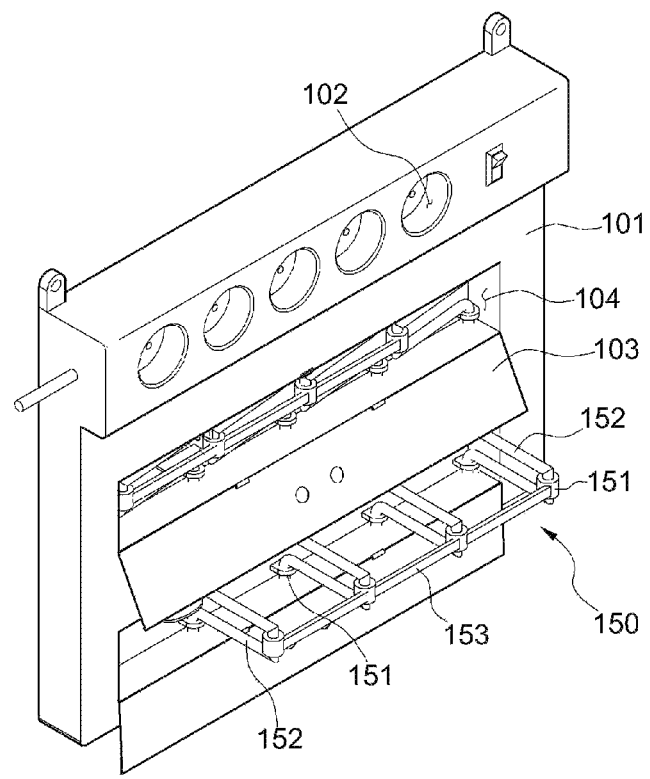

As shown in FIG. 15, an electrical outlet cover according to a fifth preferred embodiment of the present invention includes a storage part 104 formed in an electrical outlet cover 101 in a recess form, a door 103 formed to open and close the storage part 104, and a wire winding part 150 formed collapsibly and put in the storage part 104.

The collapsible wire winding part 150 mounted in the storage part 104, as shown in FIG. 15, includes a plurality of support rods 152 formed in '∩' shape of which both lower ends are hinged to the storage part 104. The support rods 152 are spaced apart from one another at predetermined intervals.

Moreover, an upper end of each support rod 152 is joined to a connection rod 153 by a hinge 151.

When the support rods 152 are folded, the support rods 152 and the connection rod 153 are inserted into the storage part 104 of the electrical outlet cover 101. When the door 103 closes the storage part 104, the wire winding part 150 is not exposed to the outside and is stored in the storage part 104 neatly.

Figure 16:
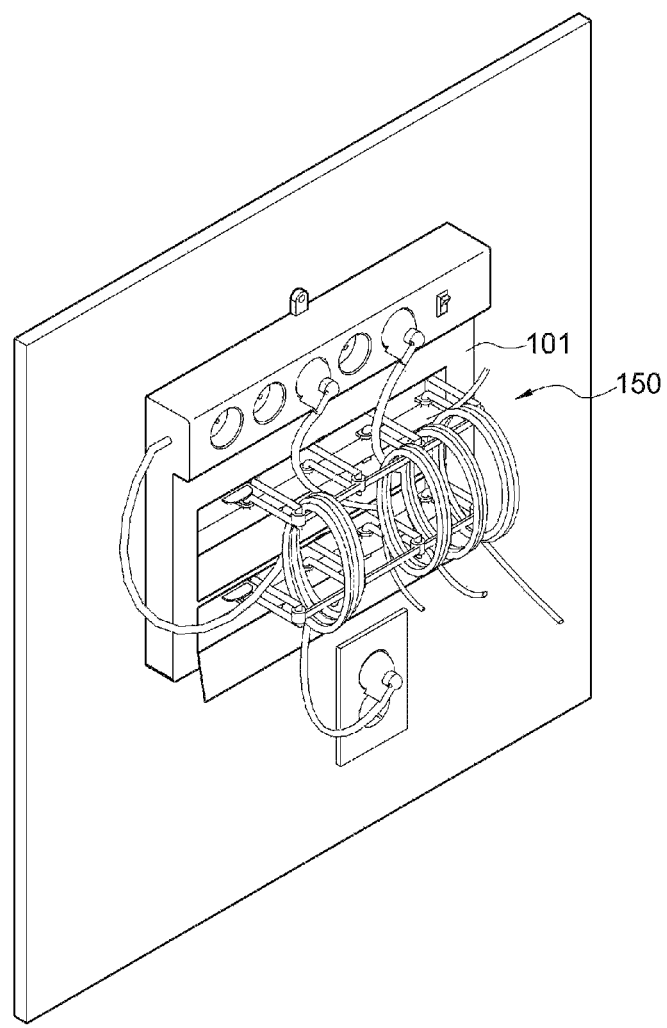

In the above state, in order to wind and organize the electric wire plugged in the electrical outlet, the user opens the door 103 and pulls the connection rod 153 or the support rod 152, then, the wire winding part 150 is drawn out and unfolded from the storage part 104, and the electric wire is wound and neatly organized on the wire winding part 150 as shown in FIG. 16.

Furthermore, FIGS. 15 and 16 illustrate the electrical outlet cover 101 joined to the power tap, but the electrical outlet cover may be joined to the wall outlet to organize the electric wire.

Sixth Embodiment

Figure 17:
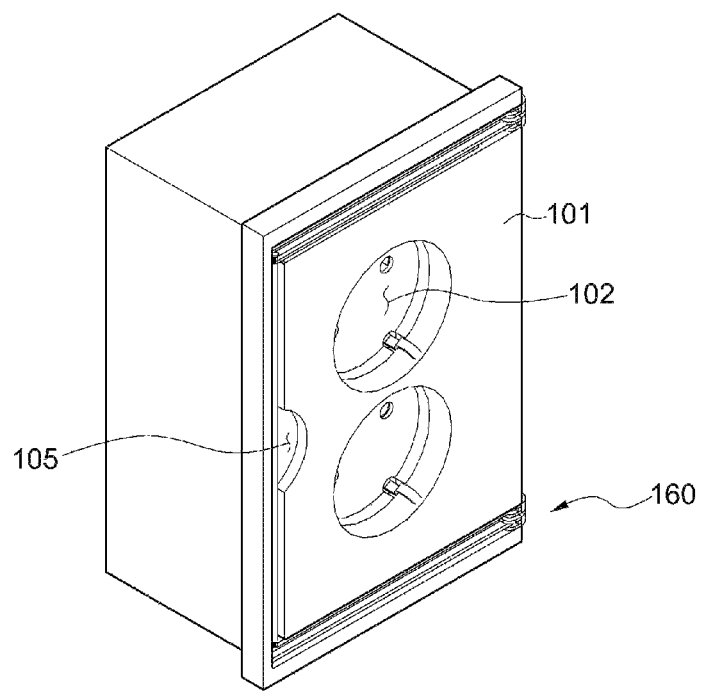
FIGS. 17 to 23 are views showing an electrical outlet cover provided with an electric wire organizer according to a sixth preferred embodiment of the present invention.

In the first to fifth preferred embodiments, the electrical outlet cover 101 extends to one side, to both sides or to upper and lower portions and the wire winding part is formed at the extended portion. However, as shown in FIG. 17, in the sixth preferred embodiment, a wire winding part 160 does not extend to one side, to both sides or to upper and lower portions from the electrical outlet but is formed on the electrical outlet cover 101.

Figure 18:
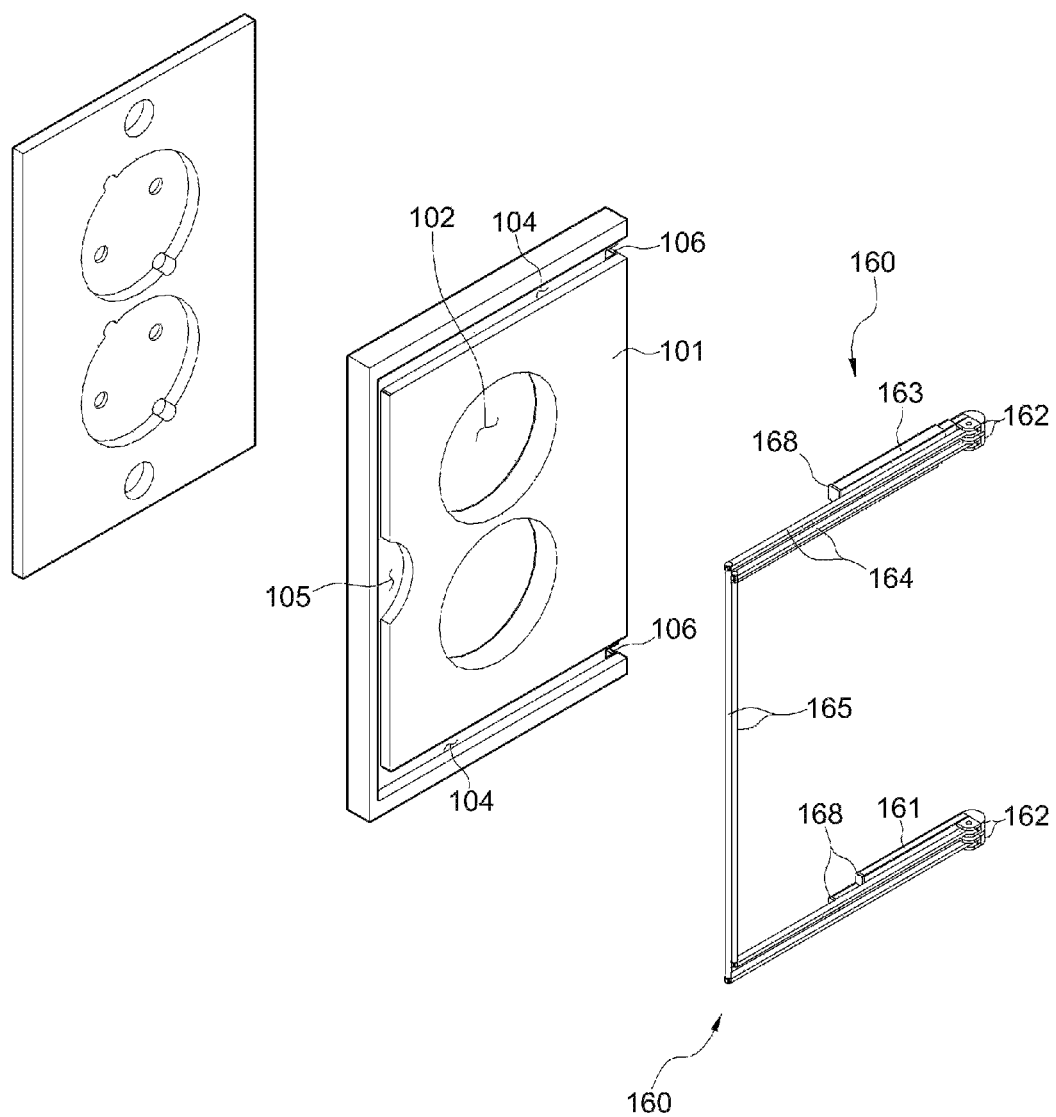
Figure 19:
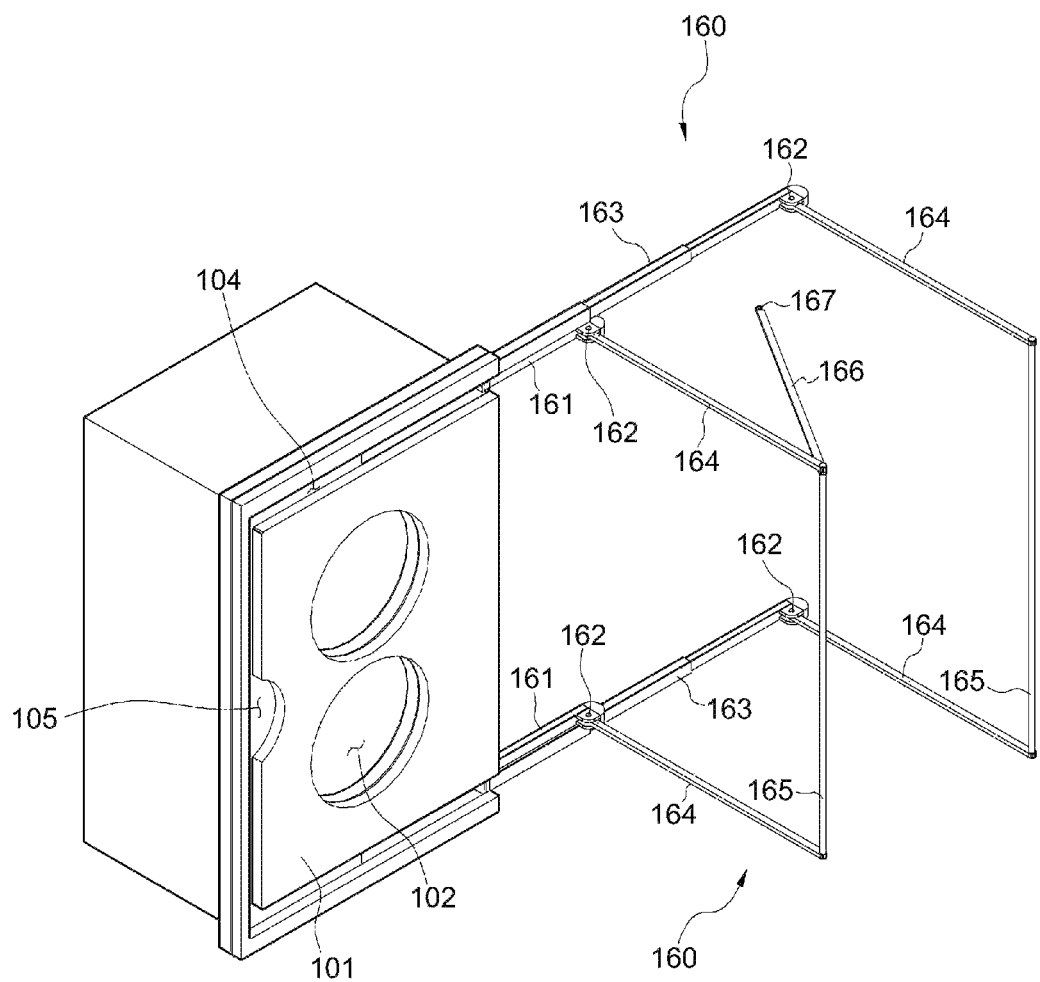

As shown in FIG. 18, a '☐'-shaped storage part 104 formed on the surface of an edge of the electrical outlet cover 101, and the wire winding part 160 is stored in the storage part 104. As shown in FIG. 19, the wire winding part 160 stored in the storage part 104 is unfolded while being drawn out to one side of the electrical outlet cover 101 so that the electric wire can be wound thereon.

As described above, the wire winding part 160 is formed to be unfolded while being drawn out in the state where it is stored in the storage part 104 of the electrical outlet cover 101. As shown in FIGS. 18 and 19, the wire winding part 160 includes: a pair of first drawing rods 161 inserted into upper and lower sides of the '-'-shaped storage part 104; support rods 164 joined to ends of the first drawing rods 161 by hinges 162; and connection rods 165 for connecting the ends of the support rods 164.

Moreover, the wire winding part 160 includes: a pair of second drawing rods 163 inserted into upper and lower sides of the '☐'-shaped storage part 104 together with the first drawing rods 161; support rods 164 joined to ends of the first drawing rods 161 by hinges 162; and connection rods 165 for connecting the ends of the support rods 164.

Because the second drawing rods 163 are formed longer than the first drawing rods 161, when the first drawing rods 161 and the second drawing rods 163 are drawn out from the storage part 104, as shown in FIG. 19, the second drawing rods 163 are drawn out further than the first drawing rods 161.

In this instance, the second drawing rods 163 are formed in multiple stages to be extendable in length. Therefore, when the second drawing rods 163 are folded, they have the same length as the first drawing rods 161, and when being unfolded, they are longer than the first drawing rods 161 as shown in FIG. 19.

The support rods 164 are combined with ends of the first and second drawing rods 161 and 163 of the wire winding part 160 by the hinges 162, and both ends of the connection rods 165 are joined to the ends of the support rods 164 combined with the first drawing rods 161.

In the same manner, both ends of the connection rods 165 are joined to the ends of the support rods 164 combined with the second drawing rods 163 by the hinges 162.

The wire winding part 160 is stored in the electrical outlet cover 101 in such a way that the support rods 164 and the connection rods 165 are rotated around the hinges 162 to be inserted into the storage part 104 formed on the electrical outlet cover 101 in the state where the first and second drawing rods 161 and 163 are inserted into the storage part 104 of the electrical outlet cover 101.

In this instance, as shown in FIG. 18, a stopper 106 is formed at an end of the storage part 104 through which the first and second drawing rods 161 and 163 are drawn in and out, and retaining jaws 168 are formed at ends of the first and second drawing rods 161 and 163. Therefore, the retaining jaws 168 of the first and second drawing rods 161 and 163 are caught to the stopper 106 of the storage part 104 so that the first and second drawing rods 161 and 163 do not completely get out of the storage part 104.

In order to unfold the wire winding part 160 to organize the electric wire plugged in the electrical outlet, the user draws out the connection rods 165 of the first and second drawing rods 161 and 163 stored in the storage part 104 and pulls the connection rods 165 in the direction of the electrical outlet cover 101.

In this instance, as shown in FIG. 19, a groove 105 is formed at a portion of the storage part 104 in which the connection rods 165 are stored from the electrical outlet cover 101, so that the user can easily draw out the connection rods 165 by putting the user's finger into the groove 105.

As described above, while the first and second drawing rods 161 and 163 are drawn out of the storage part 104, the first drawing rods 161 which is relatively shorter than the second drawing rods 163 are drawn out no longer since the retaining jaws 168 of the first drawing rods 161 are caught to the stopper 106, and the second drawing rods 163 are drawn out farther and are stopped since the retaining jaws 168 of the second drawing rods 163 are caught to the stopper 106.

Figure 20:
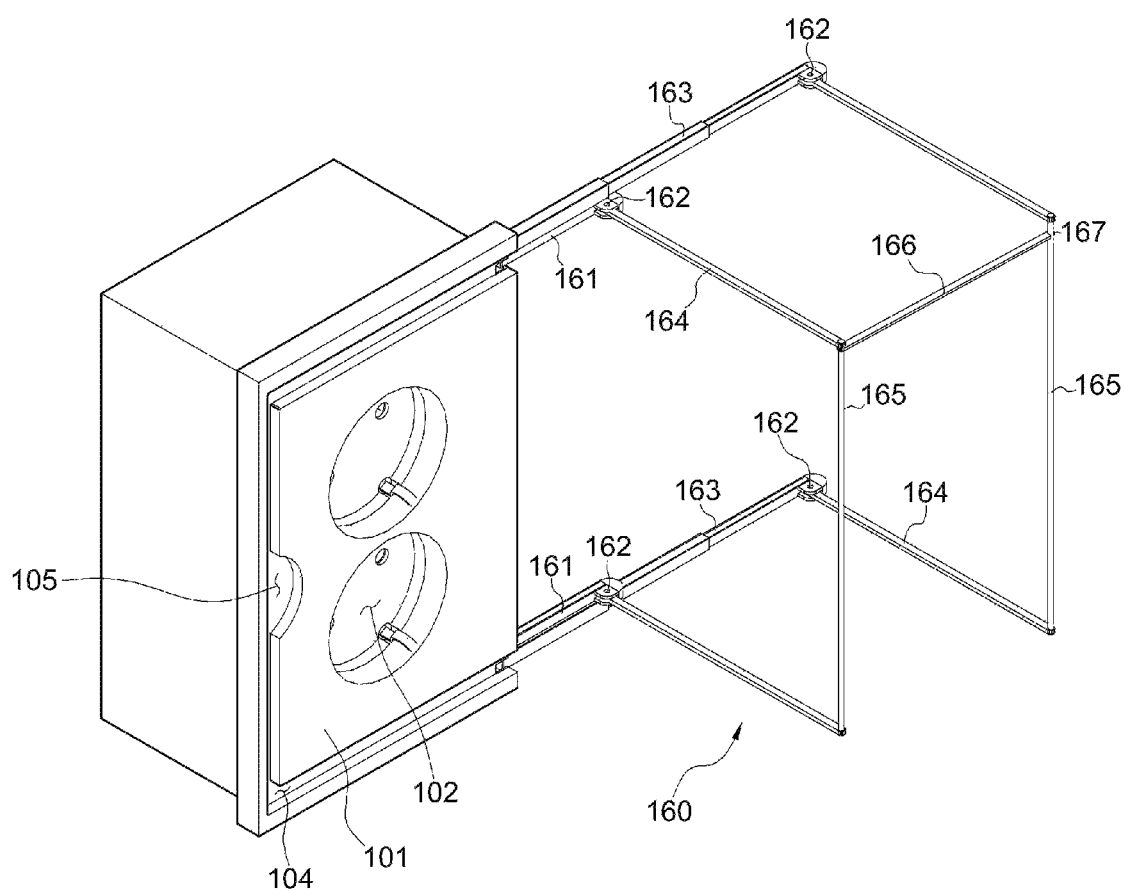

As shown in FIG. 19, after the support rods 164 of the first drawing rods 161 and the support rods 164 of the second drawing rods 163 are spaced apart from each other at a predetermined interval and a fixing bar 166 hinged to an end of the connection rod 165 of the first drawing rod 161 to be joined and fixed to the connection rod 165 of the second drawing rod 163, so that the support rods 164 of the first and second drawing rods 161 and 163 keep the spaced state. After that, the support rods 164 of the first and second drawing rods 161 and 163 are fixed not to be rotated and folded. Through the above, the wire winding part 160 is formed as shown in FIG. 20.

The electric wire plugged in the electrical outlet is wound on the wire winding part 160 to be organized neatly.

Figure 21:
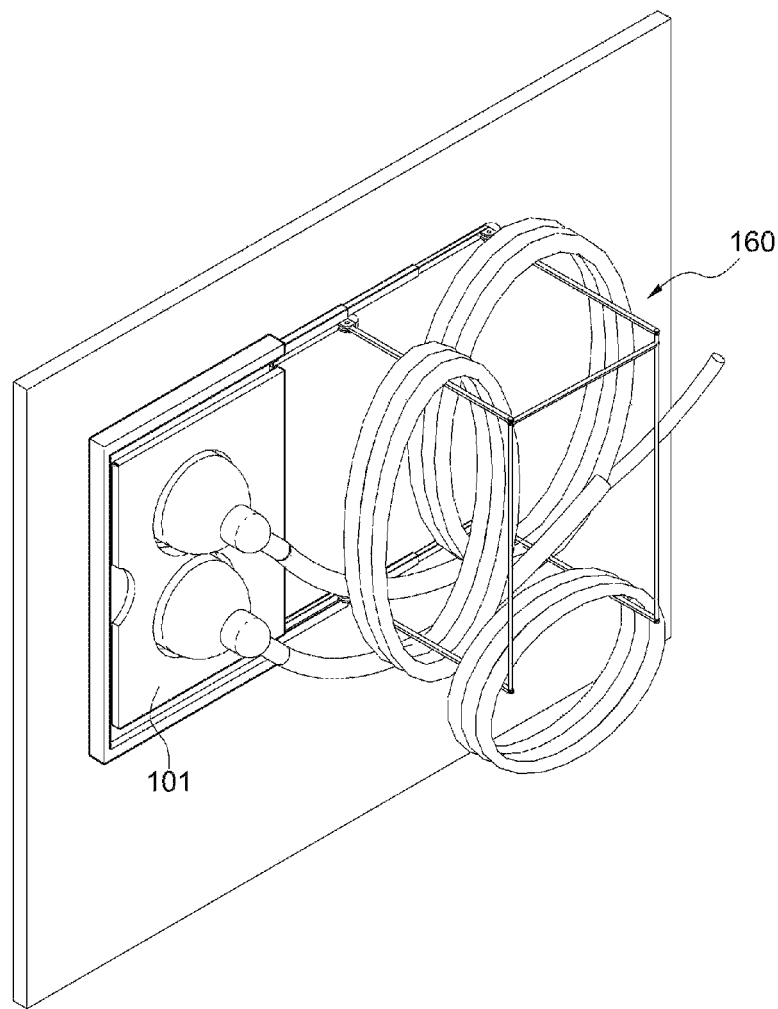
Figure 22:
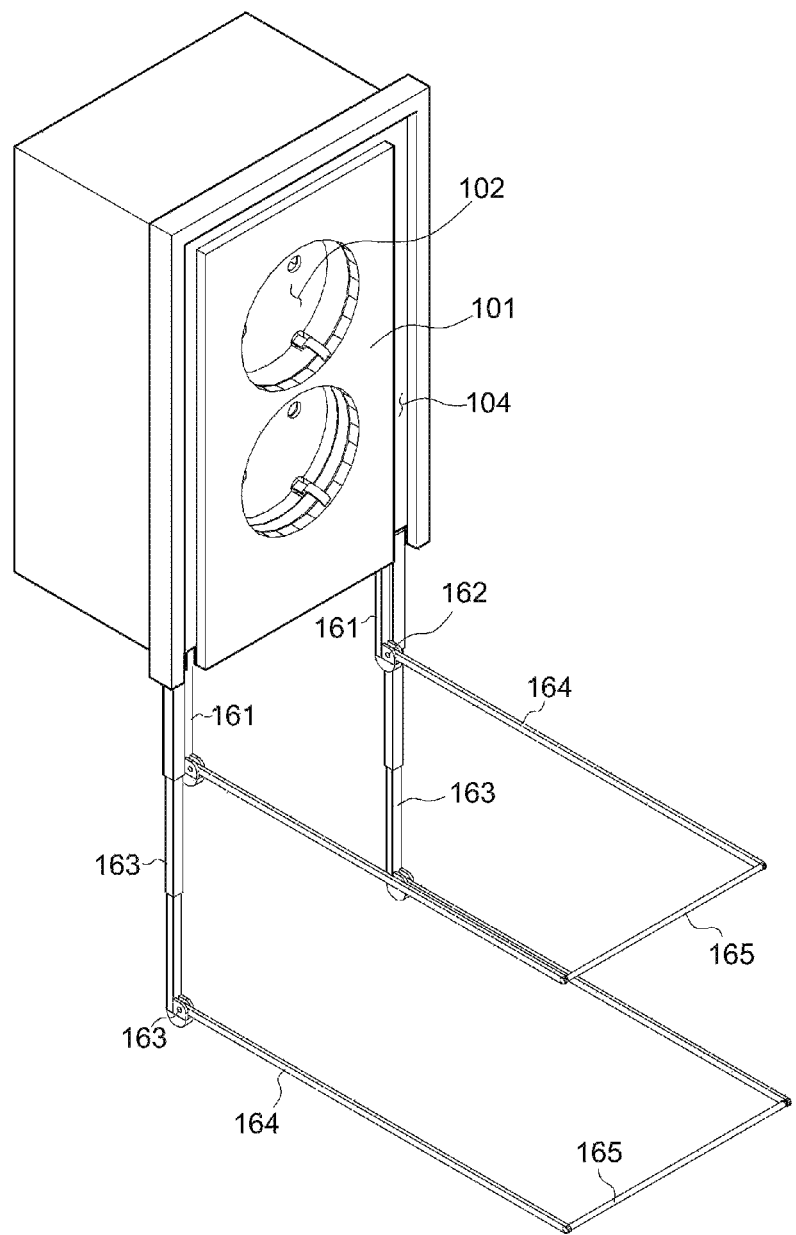
Figure 23:
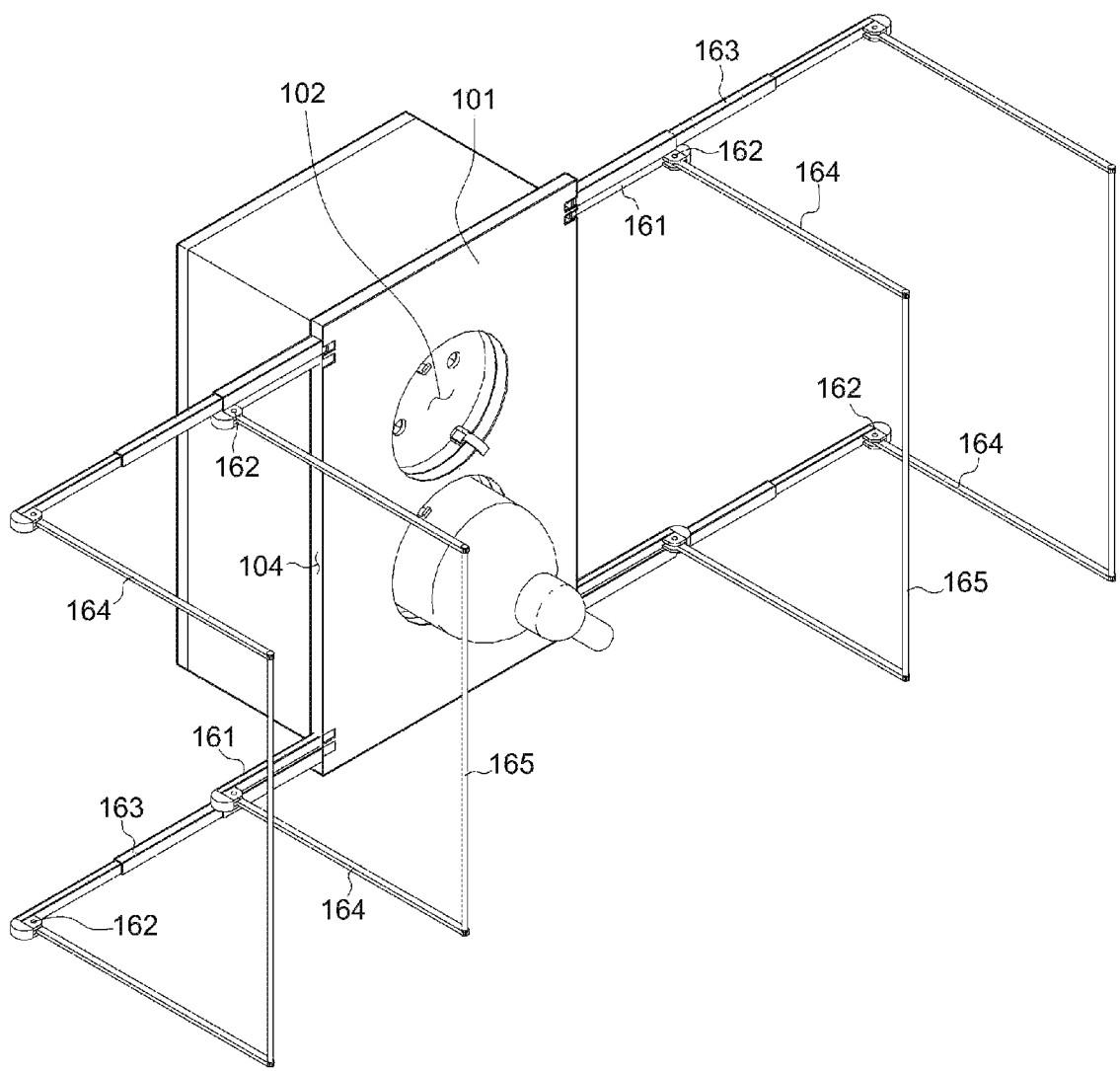

FIG. 21 illustrates that the wire winding part 160 extends in a lateral direction of the electrical outlet cover 101, but the wire winding part 160 may extend upwards or downwards from the electrical outlet cover 101 as shown in FIG. 22, or extend in right and left directions of the electrical outlet cover 101 as shown in FIG. 23.

The technical thoughts of the present invention have been described hereinafter.

It is to be appreciated that those skilled in the art can change or modify the embodiments from the above description.

Although it is not clearly illustrated or described herein, it is to be appreciated that those skilled in the art can change or modify the embodiments from the above description without departing from the scope and spirit of the present invention.

While the present invention has been described with reference to the particular illustrative embodiments, it is not to be restricted by the embodiments but only by the appended claims.

The invention claimed is:

1. An electrical outlet cover provided with an electric wire organizer comprising:
    a plate-shaped electrical outlet cover being joined to an electrical outlet box mounted on a wall surface or a power tap and having an outlet hole for exposing the wall outlet or an outlet of the power tap; and
    a wire winding part formed at an extended portion of the electrical outlet cover to allow a user to wind and organize an electric wire thereon,
    wherein the wire winding part comprises: a connection rod; support rods extending from both end portions of the connection rod in a vertical direction; fasteners formed at ends of the support rods and combined with the electrical outlet cover; auxiliary support rods protruding from a middle portion of the connection rod in a vertical direction to the connection rod; and an auxiliary connection rod formed to connect ends of the auxiliary support rods with each other.

2. The electrical outlet cover according to claim 1, wherein a storage part is formed in the electrical outlet cover in a recess form, and the wire winding part formed to be collapsible is folded and stored in the storage part.

3. The electrical outlet cover according to claim 2, wherein the collapsible wire winding part comprises:
   a connection rod;
   support rods extending from both end portions of the connection rod in a vertical direction; and
   hinges for rotatably combining the support rods with the storage part.

4. The electrical outlet cover according to claim 3, wherein any one among the hinges is a rotational fastener including a body combined with the storage part, a rotation space formed in the body so that the support rod of the wire winding part is inserted into the rotation space, and a stopper protruding from the rotation space in a perpendicular direction to the support rod and being opened at one side, so that the wire winding part is folded or unfolded since the support rod moves and rotates toward the opened portion of the stopper inside the rotation space while the connection rod or the support rod of the wire winding part is deformed elastically, and the wire winding part is fixed in the folded state or in the unfolded state since the support rod moves to one side of the stopper inside the rotation space while the connection rod or the support rod is restored elastically.

5. The electrical outlet cover according to claim 2, wherein the collapsible wire winding part comprises: support rods spaced apart from each other at a predetermined interval, wherein one side end is joined to the storage part by a hinge; a connection rod connected with the other side ends of the support rods by hinges; and a fixing unit for fixing the wire winding part in an unfolded state.

6. The electrical outlet cover according to claim 5, wherein the fixing unit comprises: a spring; a fixing button elastically supported on the spring and protruding outwardly from the connection rod; a connector of which one end is connected with the fixing button and a middle portion is connected to a shaft inside the connection rod, wherein the connector rotates around the shaft; and a fastener protruding from the other end of the connector and inserted into a fixing groove of one among the support rods,
   wherein the fastener fixes the wire winding part not to be folded in the state where the fastener is inserted into the fixing groove of the support rod, and then, when the fixing button is pressed, the wire winding part is folded while the fastener gets out of the fixing groove of the support rod.

7. An electrical outlet cover provided with an electric wire organizer comprising:
   a plate-shaped electrical outlet cover being joined to an electrical outlet box mounted on a wall surface or a power tap and having an outlet hole for exposing the wall outlet or an outlet of the power tap;
   a c-shaped storage part formed at an edge portion of the electrical outlet cover; and
   a wire winding part inserted into the storage part,
   wherein the wire winding part comprises:
   first drawing rods inserted into the storage part in a state where a support rod is joined to one end portion of each first drawing rod by a hinge;
   second drawing rods formed to be longer than the first drawing rods and inserted into the storage part in a state where a support rod is joined to one end portion of each second drawing rod by a hinge; and
   connection rods for connecting the ends of the support rods of the first drawing rods and the ends of the support rods of the second drawing rods, so that the wire winding part which is stored in the storage part of the electrical outlet cover is unfolded while being drawn out of the storage part.

8. The electrical outlet cover according to claim 7, wherein the wire winding part further comprises a fixing bar of which one end is rotatably hinged to any one among the support rods of the first drawing rods or the support rods of the second drawing rods and of which the other end is joined to the neighboring connection rod so that the wire winding part is fixed in an unfolded state.

9. The electrical outlet cover according to claim 7, wherein a stopper is formed at an end portion of the storage part, and retaining jaws are formed at end portions of the first and second drawing rods, so that the first and second drawing rods are not separated from the storage part.

10. The electrical outlet cover according to claim 7, wherein the second drawing rods are formed in multiple stages to be extendable in length, so that the second drawing rods have the same length as the first drawing rods when being folded, and are longer than the first drawing rods when being unfolded.

* * * * *